United States Patent
Carney Landow

(10) Patent No.: US 11,012,737 B1
(45) Date of Patent: May 18, 2021

(54) SYSTEMS AND METHODS FOR AUDIO ADAPTATION OF CONTENT ITEMS TO ENDPOINT MEDIA DEVICES

(71) Applicant: DISH Network L.L.C., Englewood, CO (US)

(72) Inventor: Kate Megan Carney Landow, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/859,736

(22) Filed: Apr. 27, 2020

(51) Int. Cl.
*H04N 21/439* (2011.01)
*H04N 21/45* (2011.01)
*H04N 21/643* (2011.01)

(52) U.S. Cl.
CPC ..... *H04N 21/4398* (2013.01); *H04N 21/4394* (2013.01); *H04N 21/4524* (2013.01); *H04N 21/64322* (2013.01)

(58) Field of Classification Search
CPC .......... H04N 21/4398; H04N 21/4394; H04N 21/4524; H04N 21/64322; H04N 21/432; H04N 21/4325; H04N 21/4854; H04N 21/251; H04N 21/23439; H04N 21/2402; H04L 65/602; H04L 65/607
See application file for complete search history.

(56) References Cited

U.S. PATENT DOCUMENTS

| 8,046,798 | B1 | 10/2011 | Schlack et al. |
| 8,667,527 | B2 | 3/2014 | Yan et al. |
| 8,855,681 | B1 | 10/2014 | George et al. |
| 9,848,249 | B2 | 12/2017 | Freed et al. |
| 2002/0090198 | A1 | 7/2002 | Rosenberg et al. |
| 2006/0089870 | A1 | 4/2006 | Myhr |
| 2008/0109307 | A1 | 5/2008 | Ullah |
| 2008/0195457 | A1 | 8/2008 | Sherman et al. |
| 2008/0300982 | A1 | 12/2008 | Larson et al. |
| 2009/0044217 | A1 | 2/2009 | Lutterbach et al. |
| 2009/0193126 | A1 | 7/2009 | Agarwal et al. |

(Continued)

OTHER PUBLICATIONS

U.S. Appl. No. 16/264,644, filed Jan. 31, 2019, Non Final Rejection dated Nov. 15, 2019, all pages.

(Continued)

*Primary Examiner* — Alexander Gee

(57) ABSTRACT

Methods, systems, and non-transitory, machine-readable media are disclosed for audio adaption of content items to device operations of an endpoint media device. First observation data corresponding to media device operations associated with a first media device and mapped to first content items may be processed. A first content composite including an adaptable content item may be received. The first content composite may be adapted with a first audio segment. Based on the first observation data, the first audio segment may be selected. The first content composite may be configured with the first audio segment so that the adapted first content composite plays the first audio segment when the adapted first content composite is presented. The adapted first content composite may be output for presentation, where the first endpoint media device or the second endpoint media device performs at least one operation relating to the adapted first content composite.

20 Claims, 4 Drawing Sheets

(56) References Cited

U.S. PATENT DOCUMENTS

| | | |
|---|---|---|
| 2010/0153983 A1 | 6/2010 | Philmon et al. |
| 2010/0179867 A1 | 7/2010 | Hughes et al. |
| 2012/0052941 A1 | 3/2012 | Mo |
| 2013/0174196 A1 | 7/2013 | Herlein |
| 2013/0326024 A1 | 12/2013 | Chen et al. |
| 2014/0247931 A1 | 9/2014 | Swamy et al. |
| 2014/0351045 A1 | 11/2014 | Abihssira et al. |
| 2015/0020097 A1 | 1/2015 | Freed et al. |
| 2017/0295503 A1 | 10/2017 | Govindaraju et al. |
| 2018/0014053 A1* | 1/2018 | Venkatraman et al. ............... H04N 21/2668 |
| 2018/0295134 A1 | 10/2018 | Gupta et al. |
| 2019/0116398 A1* | 4/2019 | Sharma ............. H04N 21/4668 |

OTHER PUBLICATIONS

U.S. Appl. No. 16/383,300, filed Jan. 31, 2019, Notice of Allowance dated Apr. 21, 2020, all pages.

U.S. Appl. No. 16/655,104, filed Oct. 16, 2019, Inventor: Robert Estus, et al.

\* cited by examiner

SYSTEMS AND METHODS FOR AUDIO ADAPTATION OF CONTENT ITEMS TO ENDPOINT MEDIA DEVICES

This disclosure generally relates to content delivery, and more particularly to systems and methods for adapting content items to endpoint media devices.

BACKGROUND

The evolution of wireless networks and content distribution platforms may present a number of challenges and problems for content delivery within packet streams per Internet Protocol (IP), the ATSC (Advanced Television Systems Committee) 3.0 standard, or a like protocol. Such modes of content delivery may not be linear, in contrast to traditional television delivery, for example. And, still, there are needs for integrating more deeply with endpoint devices in broadcast and other distribution environments. Content viewers are in need of better viewer experiences and more tailored service offerings. Thus, there is a need for systems and methods that address such problems. This and other needs are addressed by the present disclosure.

BRIEF SUMMARY

Certain embodiments of the present disclosure relate generally to content delivery, and more particularly to systems and methods for adapting content items to endpoint media devices.

In various aspects, a method, a system, and one or more non-transitory, machine-readable media are disclosed for audio adaption of content items to device operations of an endpoint media device, and may include one or a combination of the following operations. A first set of observation data corresponding to indications of detected media device operations associated with a first media device and mapped to a first set of content items may be processed. A first content composite including an adaptable content item corresponding to a set of one or more audio and/or video packets corresponding to audio and/or video content may be received, the first content composite from a content provider system. The first content composite may be adapted with a first audio segment. The adapting may include selecting, based at least in part on the first set of observation data, the first audio segment from a plurality of audio segments. The adapting may include configuring the first content composite with the first audio segment so that the adapted first content composite plays the first audio segment for at least part of a first presentation time when the adapted first content composite is presented. The adapted first content composite may be output for presentation, where, consequent to providing the adapted first content composite to the first endpoint media device or a second endpoint media device, the first endpoint media device or the second endpoint media device performs at least one operation relating to the adapted first content composite. At least one communication received from the first endpoint media device, the second endpoint media device, or a remote system, the first endpoint media device, and the second endpoint media device may be processed. The at least one communication may be indicative of the at least one operation relating to the adapted first content composite. A second content composite may be adapted with a second audio segment. The adapting may include selecting, based at least in part on the at least one communication indicative of the at least one operation relating to the adapted first content composite, the second audio segment. The adapting may include configuring the second content composite with the second audio segment so that the adapted second content composite plays the second audio segment for at least part of a second presentation time when the adapted second content composite is presented. The adapted second content composite may be output for presentation, where, consequent to providing the adapted second content composite to the first endpoint media device or the second endpoint media device, the first endpoint media device or the second endpoint media device performs at least one operation relating to the adapted second content composite.

In various embodiments, the plurality of audio segments may be received from the content provider system. In various embodiments, the plurality of audio segments may be received with the first content composite. In various embodiments, the first content composite may be adapted with the first audio segment as a function of time. In various embodiments, the first set of observation data may include a viewer metric as a function of time, and the first content composite may be adapted with the first audio segment as a function of the viewer metric. In various embodiments, the first set of observation data may include a current geolocation of the first endpoint media device, and the first content composite may be adapted with the first audio segment as a function of the current geolocation. In various embodiments, the at least one operation relating to the adapted first content composite may correspond to storing a code corresponding to the first audio segment by the first endpoint media device and/or the second endpoint media device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Figure 1:
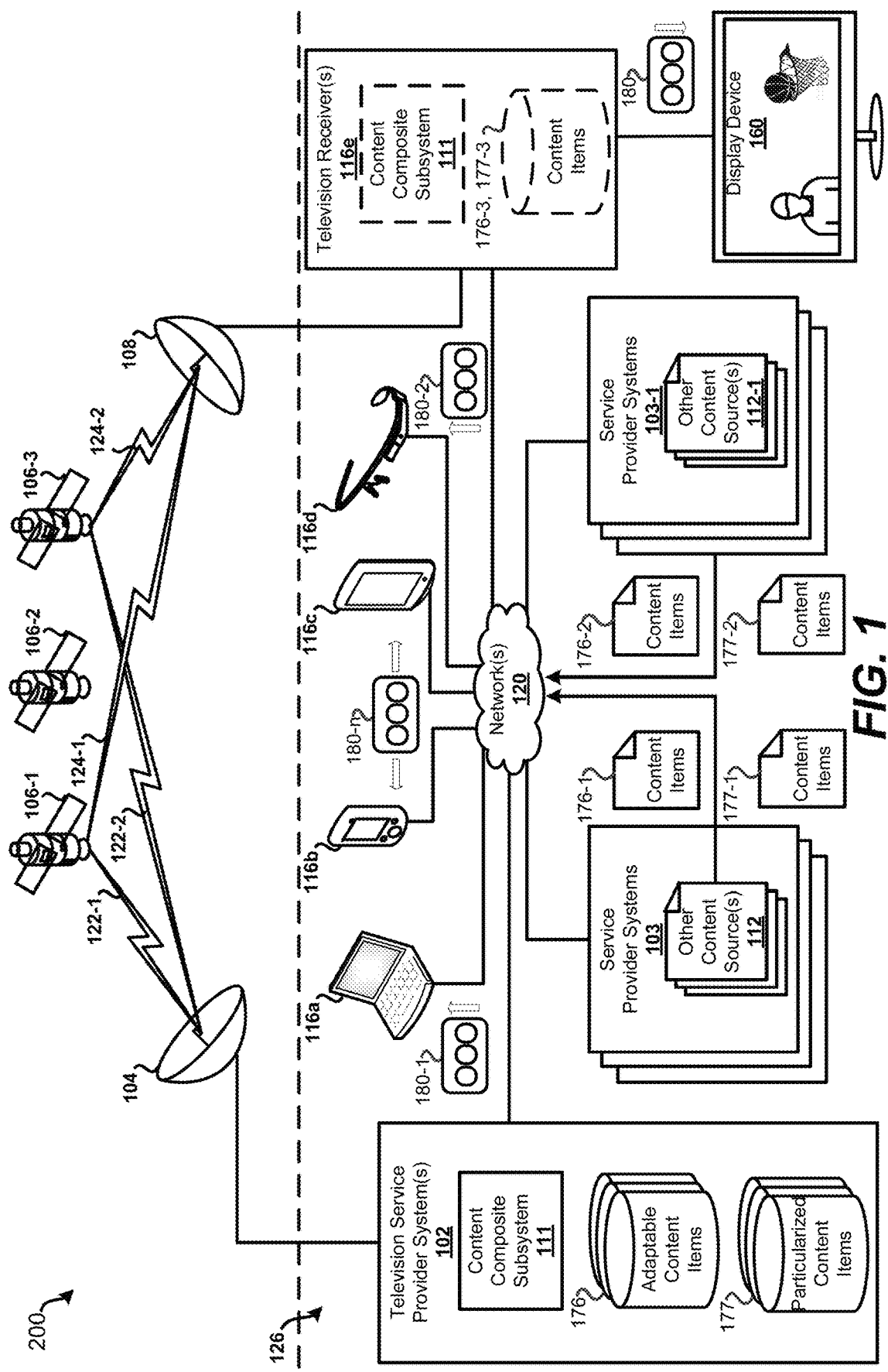
FIG. 1 illustrates a content distribution system, in accordance with disclosed embodiments of the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. Disclosed embodiments may transmit and receive data, including video content, via the networks 120 using any suitable protocol(s), as is disclosed in co-pending U.S. patent application Ser. No. 16/383,300, filed Apr. 12, 2019, the disclosure of which application is incorporated by reference herein in its entirety for all purposes, as if fully set forth herein. The system 100 may include one or more content provider systems 102, satellite uplinks 104, a plurality of orbiting (e.g., geosynchronous) satellites 106, satellite receivers 108, one or more other data source systems 103, one or more content sources 112, and media devices including adaptive routers and various endpoint devices 116 (e.g., computing devices 116a-d, television receivers 116e, and/or one or more display devices 160) communicatively couplable via the networks 120, further details of which are disclosed in co-pending U.S. patent application Ser. No. 16/655,104, filed Oct. 16, 2019, the disclosure of which application is incorporated by reference herein in its entirety for all purposes, as if fully set forth herein.

The content provider system 102 may include one or more adaptable content item 176 repositories and/or particular content item 177 repositories. The content provider system 102 may store adaptable content items 176 and/or particular content item 177 in the one or more repositories. The one or more repositories may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

Adaptable content items 176 and/or particularized content items 177 may correspond to any one or combination of raw data, unstructured data, structured data, information, and/or content which may include media content, text, documents, files, instructions, code, executable files, images, video, audio segments and/or tracks, audio video, and/or any other suitable content suitable for embodiments of the present disclosure. For example, the content items 176 may be adaptable content items that may correspond to visual and/or audiovisual content with graphical and/or audio components particularized to certain types of products and/or services. In some embodiments, the content items 176 may correspond to commercials to be presented during commercial breaks of television programming, such as televised events. In some instances, the content items 176 may be sourced by one or more of the service provider systems 103.

Some embodiments may include analyzing audio and/or video of the items/composite in order to facilitate the adapting thereof. In some embodiments, the adaptable content items 176 may correspond to video and/or audio video file structures with one or more transition points, hooks, frames, windows, and/or the like for merging with one or more particularized content items, content items 177, particularized to certain products, services, geolocations, and/or languages. In various embodiments, the adaptable content items 176 may be adapted with particularized content items 177 to create and/or adapt electronic content composites 180 particularized to certain types of products, services, geolocations, contact information, hyperlinks, viewers, times, and/or languages. In some embodiments, the content composites 180 may be transmitted to endpoint devices 116 with multiple options of content items 177 for the endpoint device 116 to select and customize the content composite 180 for presentation. In various embodiments, adaptable content items 176 and multiple options of content items 177 may be transmitted to endpoint devices 116 separately and/or in an integrated manner with the content items 176 and content items 177 integrated within composites 180. In various embodiments, content items 176 and content composites 180 may be adapted with particularized content items 177 to adapt electronic content composites 180 so that the content composites 180 are particularized. As disclosed herein, adaptation of content items 176 and content composites 180 may be a function of a number of factors and may be based at least in part on observation data (which may, in some embodiments, be received via backchannel notifications) that is indicative of detected media device operations associated with particular media devices 116 and mapped to particular content items 176, 177, and/or 202. The factors may include contextual factors, such as bandwidth, endpoint metrics, programming content being presented, endpoint inferences, user preferences, time of day, and/or the like.

For example, as disclosed herein, the adaptable content items 176 may be merged, blended, joined, overlaid, customized, and/or the like in any suitable manner with other content items 177, selected based in part on observation data indicative of detected media device operations in some embodiments, in order to create electronic content composites 180 particularized to certain types of products, services, geolocations, contact information, hyperlinks, viewers, times, and/or languages. In various embodiments, as further disclosed herein, the adaptable content items 176 and/or the other content items 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein. As another example, as disclosed herein, adaptable content items 176 and/or electronic content composites 180 may be adapted with content items 177 corresponding to audio segments particularized to certain types of products, services, geolocations, contact information, hyperlinks, viewers, times, and/or languages. For instance, the adapting may include selecting, based at least in part on a set of observation data indicative of detected media device operations, an audio segment from a plurality of audio segments and configuring an adaptable content item 176 and/or electronic content composite 180 with the selected audio segment so that the resulting content composite 180 plays the selected audio segment for at least part of a first presentation time when the content composite 180 is presented. In various embodiments, the configuring may include adding an audio segment to the adaptable content item 176 and/or electronic content composite 180 and/or replacing an audio segment thereof. In various embodiments, replacing an audio segment may include detaching (e.g., dereferencing, unselecting, or otherwise disassociating an audio file from a play command that would cause the audio file to be played along with the playing of the video file of the item/composite), cutting, and/or deleting a previously attached audio track/file from the video file and attaching a different audio track/file to the video file. In various embodiments, the audio segment may be new to, or selected from, the audio segment to the adaptable content item 176 and/or electronic content composite 180. For example, an electronic content composite 180 may include a plurality of audio segments from which one or more audio segments may be selected to play with the video portion of the composite 180. In various embodiments, the audio segment may be configured to play as an entire audio track commensurate with the presentation time of the video portion and/or to play for only part of the video timeline. In some embodiments, the configuring may include manipulating the file to mix multiple audio segments, to adjust the volumes of the audio segments, to combine audio segments at various volume levels, to fade into and/or out of audio segments, to trim the lengths of the audio segments, to combine audio segments based at least in part on matching waveforms, audio elements (e.g., beats, melodic, harmonic), and/or audio characteristics (e.g., tempo, volume, duration) of the audio segments, to adjust the positions the audio segments to particular positions with respect to the video timelines, and/or the like.

In various embodiments, the particularized content items 177 may correspond to content that is particularized to certain types of products and/or services and that, in various embodiments, may be sourced by one or combination of the system 102, one or more of the service provider systems 103, and/or the endpoint media device 116 (e.g., in instances where personalization data that may form at least part of a particularized content item 177). In various embodiments, the service provider systems 103 may correspond to one or more sources of data and/or services corresponding to the adaptable content items 176 and/or the particularized content items 177, and particularized content items 177 may correspond to the specific data and/or services sourced by a specific service provider system 103. For example, the data may correspond to one or more audio segments, a particular ecoupon, matrix code such as a QR code, a promo code, trailer, movie content, and/or the like selected for presentation as a function of a number of factors. The factors may include contextual factors, such as bandwidth, endpoint metrics, programming content being presented, endpoint inferences, user preferences, time of day, and/or the like. Such data may be particularized to a viewer category (e.g., child with a preference for a particular language and dialect). In some embodiments, such data may correspond to one or more audio segments that represent an ecoupon or a promo code, and that may be configured to invoke, awaken, open, or otherwise activate an application on an endpoint device 116 and prompt the saving of the ecoupon or promo code in the endpoint device 116. In some embodiments, such prompting may be performed at least in part by audio cues and commands directed to a virtual assistant of a nearby endpoint device 116 (e.g., a smart speaker). In some embodiments, particularized content items 177 may include personalized content that is particular to one or more viewers. In some embodiments, the personalized content may be separate from the particularized content items 177. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, content items 176 and/or 177 may be actively gathered and/or pulled from one or more data sources 112, for example, by accessing a repository and/or by "crawling" various repositories. Additionally or alternatively, the content provider system 102 and/or the subsystem(s) 111 may monitor for updates from one or a combination of the content source systems 112. Content items 176 and/or 177 pulled and/or pushed from the one or more data sources 112 may be transformed, and the transformed content items 176 and/or 177 and/or other data generated based thereon may be made available by the content provider system 102 and/or the subsystem(s) 111 for use by the subsystem(s) 111 in conjunction with content composites 180. Additional details regarding the transfer of content items 176, 177, and composites 180 are provided in the incorporated by reference applications. The content items 176 and/or 177 may be pushed and/or pulled consequent to gathering and analyzing observation data disclosed herein to identify content metrics and/or contextual factors for correlation to and identification of corresponding content items 176 and/or 177. For example, the content items 176 and/or 177 may be identified as corresponding to one or a combination of the content metrics, intra-content metrics, and/or the contextual factors that may include bandwidth, endpoint metrics, programming content being presented, endpoint inferences, user preferences, time of day, and/or the like, as disclosed herein. Accordingly, the content items 176 and/or 177, as well as the corresponding composites 180, may be particularized to one or a combination of such contextual factors and provisioned for particular viewers.

The content provider system 102 may include a content composite subsystem 111 in whole or in part. In some embodiments, additionally or alternatively, one or more of the endpoint media devices 116 may include a content composite subsystem 111 whole or in part. In some embodiments, additionally or alternatively, one or more service provider systems 103 may include a content composite subsystem 111 in whole or in part. The content composite subsystem 111 may be configured to facilitate various content adaptation features in accordance with various embodiments disclosed herein.

The system 102 with the content composite subsystem 111 may be configured to perform one or more methods for facilitating adaptive content items for delivery in a packet stream, such as methods for containerizing and adapting content items disclosed herein. For example, the system 102 with the content composite subsystem 111 may be configured to perform a method for audio adaption of content items to device operations of an endpoint media device disclosed herein. In various embodiments, part or all of the method may be performed while an endpoint media device 116 is receiving programming content and/or is outputting programming content for display. In various embodiments, at least part of the method may be performed in advance of the programming content being received by the endpoint media device 116 and, thus, may be performed before the programming content is broadcast to endpoint media devices 116 and/or before the programming content output by an endpoint media device 116 for display. In various embodiments, one or more media devices (e.g., the devices 116a-e and/or the system 102) may perform all or part of the method, with a single media device or multiple media devices performing the method.

One or more content composites 180 may be created and adapted to facilitate delivery of the one or more composites 180 and display of one or more content items 176, as modified with particular items 177, in conjunction with the televised event or other type of audiovisual content (movies, shows, etc.), e.g., so that the composites 180 correspond to the content (e.g., are directed to the same type of viewer, such as a child with a preference for a particular language and dialect). One or more indicators of one or more state changes and one or more content metrics with respect to the content (e.g., event that is televised, show, etc.) may be detected by the subsystem 111. The one or more state changes may include upcoming state changes, such as commercial breaks upcoming within a time threshold (e.g., a number of seconds and/or minutes). In some embodiments, the one or more content composites 180 may be created and/or delivered consequent to the detecting the one or more state changes. In some embodiments, the one or more content items 176 may be adapted with one or more particular items 177 consequent to the detecting the one or more state changes. The one or more content metrics with respect to the content may include intra-content metrics corresponding to indicia or specifications of languages and dialects of dialogues and/or text within the content and/or selected closed captioning. The one or more content metrics with respect to the content may include indicia or specifications of types of content (e.g., ratings for different audience designations, content designations, etc.).

The creating the content composite 180 and/or the adaptation of the one or more content items 176 with one or more particular items 177 may be a function of a current geolocation of the endpoint media device 116, with a set of rules mapped to the current geolocation and specifying geo-specific criteria for creating/adapting content composites 180, selecting content items 176 and particularized content items 177, adapting the content items 176 with particularized content items 177, and provisioning the content items 176 and particularized content items 177. The current geolocation of the media device may be determined at a time when the content is being output for display (e.g., immediately prior to when the composite 180 is to be output for display). Indicia or specifications of the current geolocation may be included in and gathered with the observation data. With the content composite 180 created and, in some instances, the one or more content items 176 adapted, the one or more content items 176 corresponding to the programming content may be output for display, e.g., during the commercial break, where the content items 176 and particularized content items 177 are selected based at least in part on location metadata mapped to the content items 176 and particularized content items 177 specifying location indicia for the content items 176 and particularized content items 177. Some sets of rules may specify a threshold distance, and the content items 176 and particularized content items 177 may be selected when a distance between the current geolocation of the endpoint media device 116 and the location indicia for the content items 176 and particularized content items 177 satisfies the distance threshold. Some sets of rules may specify that only certain types of particularized content items 177 may be selected when the distance threshold is not satisfied (e.g., promo codes but not other types).

Disclosed embodiments may confirm and verify that a content item 176 (in some instances, as modified with one or more particular content items 177, such as one or more audio segments, matrix code such as a QR code, promo code, particularization data, and/or the like) was transmitted to an endpoint media device 116. Disclosed embodiments may confirm and verify device operations indicating that the modified or unmodified content item 176 was presented with a display device at the endpoint media device 116 (which display device may be integrated with the endpoint media device 116 or otherwise communicatively coupled to the endpoint media device 116). Disclosed embodiments may confirm and verify that the modified or unmodified content item 176 was shown to an intended end user if and when utilizing encryption and/or an encryption flag. Disclosed embodiments may confirm and verify device operations indicating to what extent the modified or unmodified content item 176 was presented (in full or to a lesser extent). Disclosed embodiments may confirm and verify detection of one or more operations executed consequent to the presentation (e.g., activating an application on an endpoint device 116 and prompting the saving of an ecoupon or promo code in the endpoint device 116, automated transcribing an audio segment portion to facilitate the saving of the item in the endpoint device 116, scanning a matrix code, loading the item and/or another particularized content item 177 into mobile app such as a digital wallet of the endpoint media device 116, utilizing the particularized content items 177 such as to order a product and/or service, etc.) and metrics of the operations (e.g., time of execution). In various embodiments, one or a combination of the above may be confirmed and verified based at least in part on observation data indicative of detected media device operations.

Such observation data may be gathered by way of return channel notifications from the endpoint device 116 to the system 102, which may contribute to the observation data 229 and feedback loop features disclosed further herein. In addition or in alternative to such communications from endpoint devices 116, the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like). Such notifications may also contribute to the observation data 229 and feedback loop features.

Figure 2:
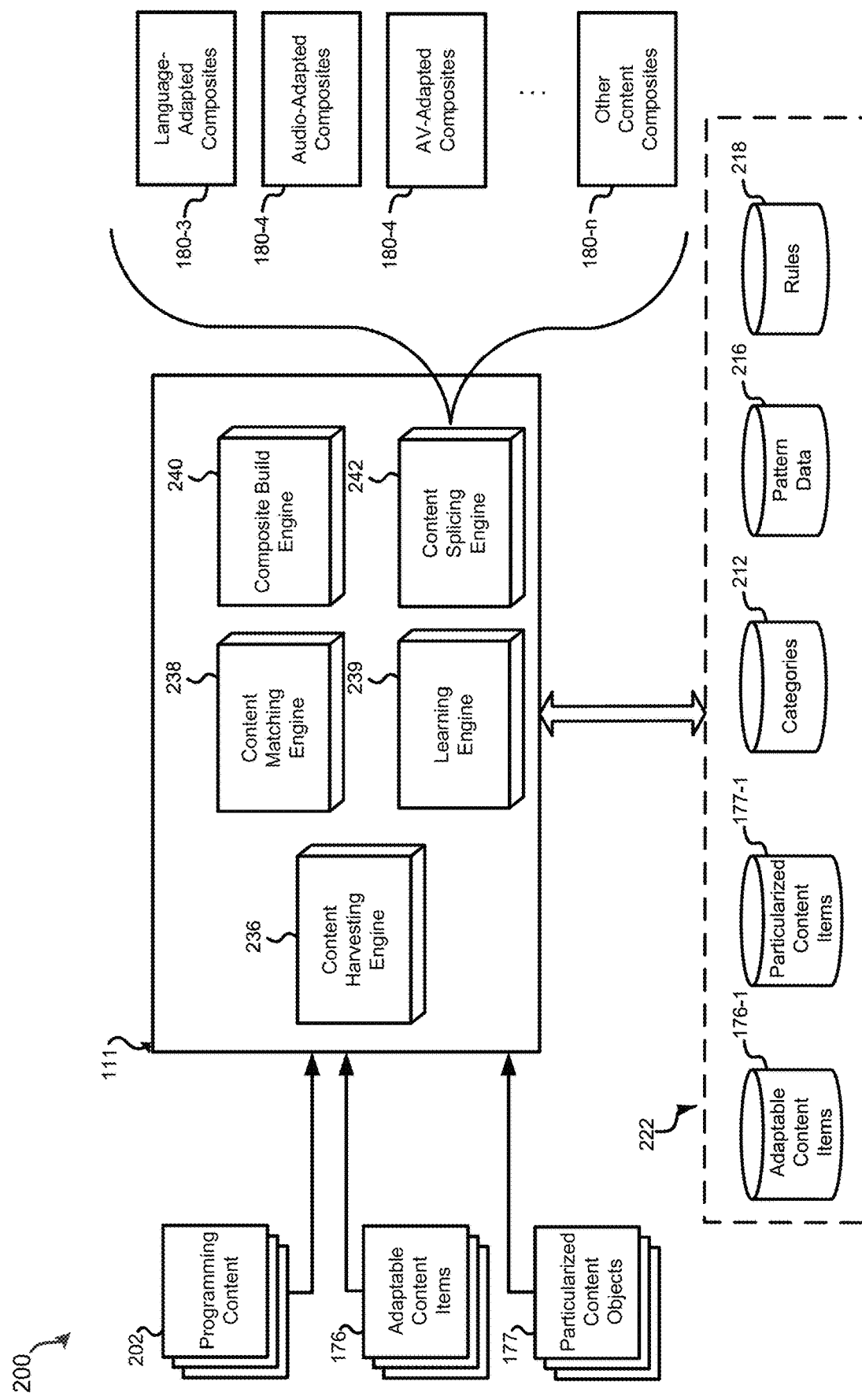
FIG. 2 illustrates a diagram of an adaptive content composite system, in accordance with disclosed embodiments of the present disclosure.

FIG. 2 illustrates a functional diagram of an adaptive content composite system 200, in accordance with disclosed embodiments of the present disclosure. In various embodiments, the content composite system 200 may be included in whole or in part in the content provider system 102 and/or an endpoint media device 116. In some embodiments, the content composite system 200 may be separate from, and provide content to, the content provider system 102. In some embodiments, the content composite system 200 may be included in the end-user system and may be included in the television receiver 116e and/or one or more of the computing devices 116. In some embodiments, various features of the content composite system 200 may be distributed between the television receiver 116e and upstream of the television receiver 116e. Likewise, in some embodiments, various features of the content composite system 200 may be distributed between one or more of the computing devices 116 and upstream of the one or more computing devices 116. While not all components of the adaptive content composite system 200 are shown, the system 200 may include one or a combination of such components.

As depicted, the content composite system 200 may include a content composite subsystem 111. The content composite subsystem 111 may include or otherwise correspond to an audiovisual control engine that, as with disclosed embodiments of the other engines, may include instructions retained in processor-readable media and to be executed by one or more processors. The content composite subsystem 111 may be communicatively coupled with interface components and communication channels (e.g., of the television receiver 116e and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the content provider system 102 and/or one or more other service providers 103. The programming content 202 may include various components, including without limitation, one or more video tracks, audio tracks, audio video tracks, metadata tracks, close captioning information, and/or the like. In some embodiments, the content composite system 200 may retain received programming content 202 in content storage 222. The content storage 222 may include any suitable form of storage media, such as any suitable form disclosed herein.

The content composite subsystem 111 may be further configured to receive adaptable content items 176 and particularized content items 177. Additionally, the composite subsystem 111 may be further configured to receive content composites 180 in some embodiments. The content composite subsystem 111 may include a harvesting engine 236 configured to aggregate adaptable content items 176, particularized content items 177, content composites 180, and/or programming content 202 in order to facilitate content splicing features disclosed herein. The content composite subsystem 111 may include a matching engine 238, which, in various embodiments, may be configured to analyze, classify, categorize, characterize, tag, and/or annotate adaptable content items 176, particularized content items 177, content composites 180, and/or programming content 202.

The content composite subsystem 111 may include a content splicing engine 242. In some embodiments, the content splicing engine 242 may include a multiplexer. In various embodiments, the multiplexer may create a digital stream of data packets containing the video, audio, and, in some embodiments, the metadata to output the programming content 202, adaptable content items 176, and/or the composites 180 created and/or adapted with selected particularized content items 177. In various embodiments, the content splicing engine 242 may be implemented at the receiver 116e, the device 116, and/or the service provider system 102. In some embodiments where the content splicing engine 242 is implemented at the service provider system 102, the multiplexed data stream may be transmitted via the one or more networks 124 for provisioning to computing devices 116 or via a particular transponder stream via a transponder of a satellite for provisioning to receivers 116e as further detailed in the incorporated applications.

The content splicing engine 242 may, in various embodiments, correspond to a processor, such as a main processor, a core processor, digital signal processor, and/or like. In some embodiments, the content splicing engine 242 may perform at least part of the adapting and configuring of content items 176 with content items 177. The content splicing engine 242 or another component of the subsystem 111 may select one or more audio segments 177, for example, based at least in part on a set of observation data indicative of detected media device operations. The content splicing engine 242 may configure an adaptable content item 176 with the selected one or more audio segments 177 to play the selected audio segment for at least part of a first presentation time when the corresponding content composite 180 is presented. In various embodiments, the content splicing engine 242 may add one or more audio segments 177 to an adaptable content item 176 and/or replace an audio segment of the adaptable content item 176. The content splicing engine 242 may identify one or more portions of an adaptable content item 176 to be adapted based at least in part on one or more content items 177. In various embodiments, the content splicing engine 242 may identify by audio and/or video segment/file analysis and/or analysis of tag data that defines one or more areas within the adaptable content item 176 that correspond to certain portions for adaptation. As disclosed herein, such analyses and/or tag data may define an audio segment of the content item 176 for replacing at least partially. In some embodiments, an audio segment of the content item 176 may not be replaced, where the content item 176 has no audio and/or one or more audio content items 177 are added to the content item 176, which may include layering on and/or mixing with one or more audio content items 177 of the content item 176. In various embodiments, the content splicing engine 242 may replace an audio segment by detaching (e.g., dereferencing, unselecting, or otherwise disassociating an audio file from a play command that would cause the audio file to be played along with the playing of the video file of the item/composite), cutting, and/or deleting a previously attached audio track/file from the video file and attaching one or more different audio tracks/files 177 to the video file. In various embodiments, selected audio segment may be configured to play as an entire audio track commensurate with the presentation time of the video portion of the content item 176 and/or to play for only part of the video timeline. In various embodiments, the content splicing engine 242 may manipulate the file to mix multiple audio segments, to adjust the volumes of the audio segments, to combine audio segments at various volume levels, to fade into and/or out of audio segments, to trim the lengths of the audio segments, to combine audio segments based at least in part on matching waveforms, audio elements (e.g., beats, melodic, harmonic), and/or audio characteristics (e.g., tempo, volume, duration) of the audio segments, to adjust the positions the audio segments to particular positions with respect to the video timelines, and/or the like. The content splicing engine 242 may, in some embodiments, configure the content item 176 with a set of audio segments 177 from which one or more of the audio segments 177 may be selected to play with the content item 176 as part of the composite 180.

In some embodiments, the harvesting engine 236 may be configured to receive, pull, process, buffer, organize, rank, and/or store adaptable content items 176, particularized content items 177, content composites 180, and/or programming content 202 as a function of one or a combination of the content metrics and/or the contextual factors. For example, the adaptable content items 176, particularized content items 177, content composites 180, and/or programming content 202 may be categorized and ranked according to identification as corresponding to one or a combination of the content metrics and/or contextual factors including bandwidth, endpoint metrics, programming content being presented, endpoint inferences, user preferences, time of day, and/or the like, as disclosed herein. Consequently, further features of adaptation and provisioning disclosed herein may then be provided based at least in part on the categorizations and rankings.

In various embodiments, the content provider system 102, the television receiver 116e, and/or the computing device 116 may include one or more applications to facilitate the subsystem 111 analyzing and consolidating data feeds and/or event updates received from various data sources 112. As an example, data feeds and/or event updates may include, but are not limited to, updates (real-time and/or otherwise) and/or continuous data streams received from one or more data sources 112, which may include real-time events related to promotions, redeemable content items, special offerings, discounts, sports event information, Twitter® feeds, Instagram® posts, Facebook® updates, Amazon® updates, and/or the like.

As disclosed above, the adaptable content items 176 and composites 180 may be particularized. In some embodiments, the adaptable content items 176 and composites 180 may correspond to commercials to be presented during commercial breaks of the programming content 202. In various embodiments, the content items 176 and composites 180 may include audiovisual content broadcast and/or otherwise transmitted by the content provider system 102. In some embodiments, adaptable content items 176 and/or composites 180 may be pushed by the content provider system 102 to the subsystem 111. In addition or in alternative, adaptable content items 176 and/or composites 180 may be pulled by the subsystem 111 (e.g., by the harvesting engine 236) from the content provider system 102.

In various embodiments, sets of one or more adaptable content items 176 sets of one or more content items 177, and/or sets of one or more composites 180 may be transmitted to the subsystem 111 in batches. For example, sets may be transmitted to the subsystem 111 on a periodic or otherwise specified basis. In some embodiments, the subsystem 111 may store the sets locally and, subsequently select one or more of the adaptable content items 176 and/or composites 180, as well as one or more content items 177 with which to adapt the one or more adaptable content items 176 and/or composites 180 when needed for presentation during an upcoming break in the programming content 202 and/or when needed for presentation during the programming content 202 based at least in part on the subsystem 111 processing observation data indicative of detected media device operations and using the observation data as one or more bases for the selection and adaptation.

In various embodiments, sets of one or more adaptable content items 176 sets of one or more content items 177, and/or sets of one or more composites 180 may be transmitted to the subsystem 111 on an as-needed basis when the subsystem 111 is receiving programming content 202 corresponding to a certain type (e.g., a televised sporting event), is specified to receive such programming content 202, is predicted from observation data to receive programming content 202 based at least in part on a detected viewing pattern of past viewing of previous programming content 202 (e.g., of a certain type of event, at certain times, on certain days, etc.), and/or is predicted from observation data to receive programming content 202 based at least in part on a detected pattern of past viewer responses to content composites 180 for previous programming content 202 of that type. Additionally or alternatively, in some embodiments, sets of one or more adaptable content items 176 and/or sets of one or more content items 177 may be selected based at least in part on the observation data indicative of media device operations (e.g., by the service provider system 102 and/or the subsystem 111) as tailored for particular event viewing habits, ordering patterns, and inferred interests of viewers.

In various embodiments, sets of one or more adaptable content items 176 sets of one or more content items 177, and/or sets of one or more composites 180 may be selected (e.g., by the service provider system 102) for particular time periods and may be transmitted to the subsystem 111 with an assignment (e.g., by way of tag data or other metadata) for the designated time period. Additionally or alternatively, in some embodiments, sets of one or more adaptable content items 176 sets of one or more content items 177, and/or sets of one or more composites 180 may be selected (e.g., by the service provider system 102) for particular channels and/or television programs and may be transmitted to the subsystem 111 with an assignment (e.g., by way of tag data or other metadata) for the designated channels, shows, movies, and/or television programs. The transmission of the sets may be in response to the subsystem 111 pulling the sets from the service provider system 102. For example, the subsystem 111 may pull adaptable sets of one or more adaptable content items 176 sets of one or more content items 177, and/or sets of one or more composites 180 based at least in part on the observation data indicative of media device operations. This may include detecting programming content 202 currently being viewed via a television receiver 116e or computing device 116, detecting programming content 202 specified to be viewed or recorded, predicting programming content 202 of interest to a viewer based on detected viewing patterns and/or patterns of interacting with content items 176, 177, determining upcoming programming content 202 based on electronic programming guide information received, and/or the like. In a similar manner, sets of one or more adaptable content items 176 sets of one or more content items 177, and/or sets of one or more composites 180 may be pulled from, or pushed by, one or more service provider systems 103, in various embodiments using one or more of the various methods disclosed, to the subsystem 111 directly or indirectly (e.g., by way of the content provider system 102, which may then transmit the sets to the subsystem 111) for particular time periods, with assignments for designated channels, shows, movies, television programs, etc. For example, in conjunction with the selection of sets of one or more adaptable content items 176, sets of one or more content items 177 that match the one or more adaptable content items 176 may be pulled from one or more service provider systems 103. In various examples, the matching may be based at least in part on the observation data.

The subsystem 111 may use the rules 218 to adaptively control content composite creation, delivery, adaptation, and interactions with such content. The rules 218 may include conditions corresponding to particulars of particularized content items 177 and may specify one or more operations to be performed when one or more of the conditions are satisfied. The conditions may, in some instances, be received from one or more provider systems 103. The categorization 212 of the harvested regulations and updated regulations may be used to create various sets of rules 218 governing the creation, provisioning, and adaptation of particularized content composites 180. Provisioning and/or adaptation of content composites 180 may be differentiated according to show type and/or viewer type, with time, place, and/or manner restrictions/specifications contingent on show type and/or viewer type, among other factors.

The various sets of rules 218 may govern the creation, provisioning, and adaptation of content items 176 and particularized content composites 180 as a function of a number of factors, which may include various, differently weighted, contextual factors—such as endpoint metrics, time of day, bandwidth, programming content being presented, endpoint inferences, user preferences, and/or the like. For example, the endpoint metrics may include location, and the various sets of rules 218 may govern the creation, provisioning, and adaptation of particularized content composites 180 as a function of a location of a particular receiver 116e and/or device 116. As detailed in the incorporated by reference applications, location data may be captured. The location data capture may facilitate geo-sensitive adaptive content splicing and to differentiate which sets of rules 218 apply to a given content provisioning instance with respect to a program and which content items 176 and/or 177 to select for adaption and provisioning of a composite 180 as a function of the current device 116 location. Thus, for example, one or more particular audio segments 177 may be selected to use to adapt a content item 176 and/or composite 180 when a distance between the current geolocation of the endpoint media device 116 and the location indicia for the one or more particular audio segments 177 is within a distance threshold specified by one or more sets of the rules 218.

Various sets of rules 218 may provide for various types of restrictions and/or specifications on creating, adapting, and/or provisioning content composites 180. In addition or alternative to geolocation restrictions/specifications, the various types of restrictions and/or specifications may include restrictions on and/or specifications of types of content (e.g., ratings for different audience designations, content designations, etc.) for which content composites 180 may or may not be presented and the manner in which content composites 180 may be presented for the different types of programs and/or viewers (e.g., adult-directed ads may not be presented during children-directed shows and/or to viewers identified as children). The various types of restrictions and/or specifications may further include time restrictions, such as limits on a time of day on how the adaptation is to be done and when certain adapted content composites 180 may be presented, limits on time in advance particular event (e.g., days, hours, etc.) and/or portion thereof ahead of which content composites 180 may be presented, and the like. For example, adaptation as a function of time of day may include selecting content items 177 directed to children when the presentation time is between 3 PM and 6 PM, selecting content items 177 directed to family when the presentation time is between 6 PM and 10 PM, and selecting content items 177 directed to adults when the presentation time is between 10 PM and 7 AM.

However, the subsystem 111 may intelligently identify and adapt to exceptions to such temporal defaults, e.g., as a function of more heavily weighted factors such as endpoint inferences. The subsystem 111 may infer that the viewer corresponds to one or more particular categories (e.g., a child with a preference for a particular language and dialect) based at least in part on the programming content 202 being viewed (e.g., cartoons in a particular Spanish dialect) and/or being delivered at a particular or proximate time (e.g., within a half-hour timeframe) to the endpoint device 116 and/or based on observation data gathered via backchannel notifications regarding the programming content 202 being delivered at the particular or proximate time. Say, for example, that an endpoint inference may correspond to inferring that a viewer is a child. Based at least in part on that inference, one or more particular content items 177 may not be selected and/or a particular content item 177 may be selected. In such an example, when the inference corresponds to determining a child being a viewer, a particular audio track 177 may not be selected for presentation (e.g., that a particular toy is available or an adult-directed audio segment) even though a temporal factor may be weighted in favor of the selection (e.g., when the time is after 10 PM), because the inference of the viewer type corresponding to a child may be more heavily weighted. Further, a content composite 180 may include particularized content items 177 particularized to two or more language variants (e.g., by way of text and/or audio in 26 different languages and/or dialects). In the example above of a determined viewer preference for a particular Spanish dialect, one or more audio and/or video content items 177 corresponding to the language and dialect may be selected for adaptation of the composite 180 and presentation to the viewer. Additionally, any embodiment herein may conform to explicitly specified user preferences, which may override other factors such as inferences.

Additionally or alternatively, restrictions on and/or specifications of the manner in which content composites 180 may be adapted and presented may include differentiating types of devices (e.g., smart phone versus laptop computer, laptop computer versus television receiver, etc.) which will display the content composites 180. Such device determinations may be made based at least in part on the observation data in some embodiments. Consequently, certain types of adaptations may be accorded to certain types of devices. For example, audio segments 177 may be used instead of video items 177 to audio adapt content items 176 when the device is a mobile phone, and vice versa with video adaptation when the device is a television receiver. Certain embodiments may provide for creation and/or adaptation of content composites 180 as a function of bandwidth constraints. For example, the observation data and/or backchannel communications disclosed herein may include indicia of bandwidth abilities and/or bandwidth strain performance metrics experienced at an endpoint device 116. Such indicia may, in some instances, indicates buffering time, streaming disruptions, and/or presentation degradation experience by the endpoint device 116. Such indicia from an endpoint device 116 may be added to other data utilized by the subsystem 111, which data may be utilized as bases for adjustment of content composite 180 creation and/or the adaptation in order to optimize the content composites 180 based at least in part on the data, including band with indicia. The optimization of the creation and/or adaptation may include selecting differing content items 177 contingent on the bandwidth constraints informed by the data. The type, size, and/or number of content items 177 may be selected based at least in part on such data. By way of example, the subsystem 111 may create and/or adapt content composites 180 so that the content items 177, in addition to the other components of the composites 180 meet bandwidth constraints. Audio adaptation may utilize less bandwidth than video adaptation, and the subsystem 111 may bias the adaptation toward audio adaptation over video adaptation in order to meet bandwidth constraints. Such biasing may include eliminating video adaptation and only employing audio adaptation. Such biasing may include limiting video adaptation (e.g., only including one video content item 177 per composite 180), but allowing for more audio adaptation (e.g., including multiple audio content items 177 per composite 180). In certain instances, for example, the particularization may be constrained as a function of bandwidth specifications such that the particularization may be limited so that the language variants of text is less than the language variants of audio (e.g., text in a single language, with audio in 12 different languages). Further, as disclosed further herein, content items 176 may be adapted with multiple content items 177 in various embodiments, and the content composites 180 may be transmitted to the endpoint device 116 with multiple content items 177, from which the endpoint device 116 may select for ultimate adaptation and presentation at the endpoint device 116.

Figure 3:
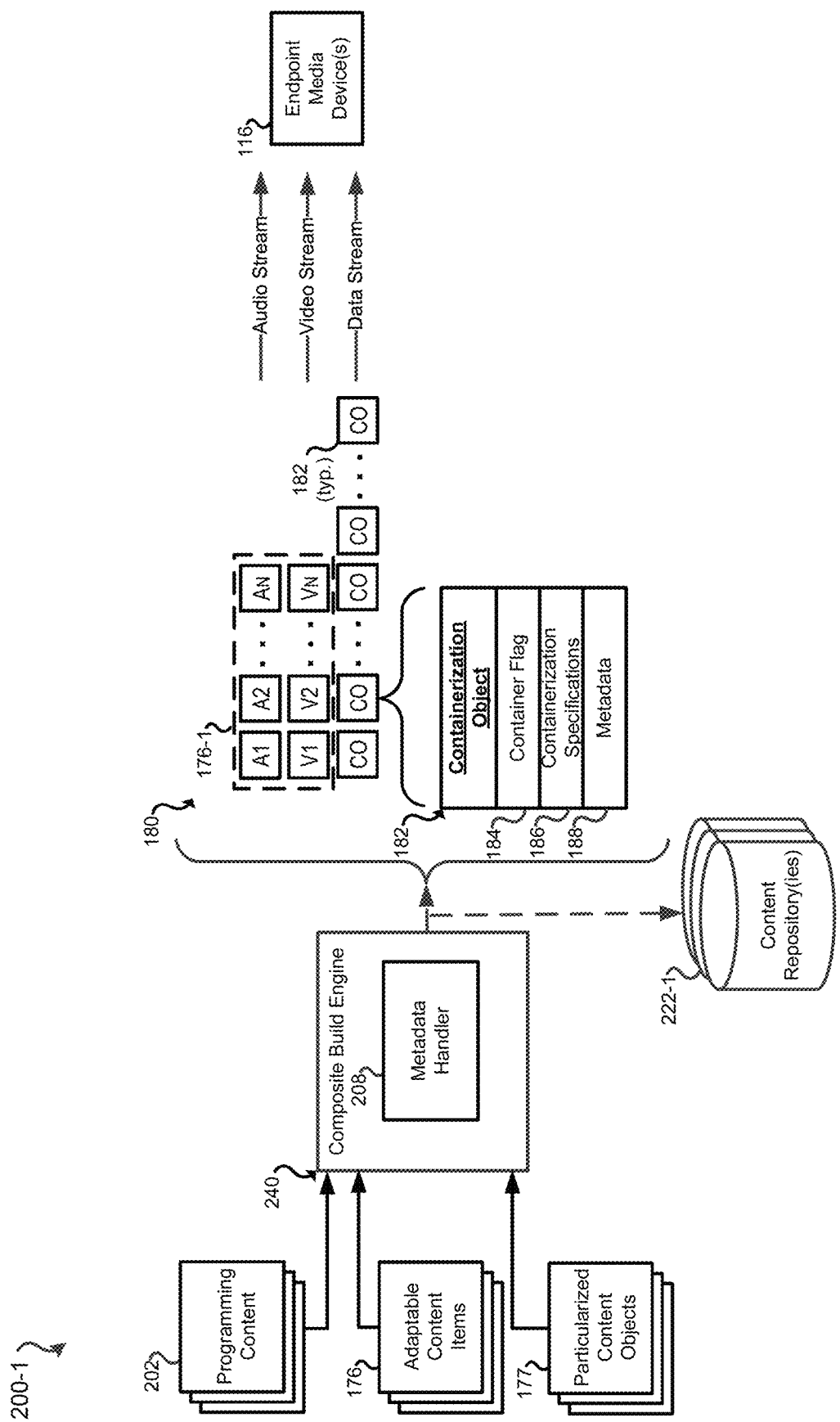
FIG. 3 illustrates a composite build engine, in accordance with disclosed embodiments of the present disclosure.

FIG. 3 is a simplified illustration of a composite build engine 240, in accordance with disclosed embodiments of the present disclosure. In various embodiments, the composite build engine 240 may be included in the subsystem 111 or may be separate from the subsystem 111. The composite build engine 240 may, in some embodiments, be included in the content provider system 102. Having processed an adaptable content item 176, the subsystem 111 may create one or more content composites 180 that may include the adaptable content item 176. In various embodiments, the composites 180 created by the composite build engine 240 may include fully adapted content items 176 adapted with content items 177 for delivery to endpoint devices 116, and/or content items 176 that are to be adapted with content items 177 (e.g., content items 177 included in the composites 180) after delivery to endpoint devices 116.

To create the content composites 180, disclosed embodiments may provide the content item 176 with containerization objects 182 that each containerize a set of data as a persistent object in time. Each containerization object 182 may be configured to function in a broadcast environment while facilitating the various features disclosed herein. For example, among other things, the containerization object 182 may create the ability to integrate deeply with endpoint devices 116 in a broadcast environment. With the containerization object 182, the content composites 180 may allow the content item 176 to be treated as an object wrapped with an identity and with one or more layers of encryption. As disclosed herein, the one or more layers of encryption provided with various embodiments may correspond to encryption at one or more software layers, as distinguishable from hardware encryption of a device 116. The various embodiments of one or more layers of encryption may allow for encryption of one or a combination of return channel communications, data regarding endpoint device 116 operations that contribute to observation data 229, content items 176, content items 177, composites 180, and/or components thereof, which may particularly include encryption of personalization and transactional data, which may provide for DRM, and which may ensure end user privacy.

The composite build engine 240 may configure the containerization object 182 to include a container flag 184. The container flag 184 may include one or more parameters that indicate one or more containerization specifications 186. The container flag 184 may be thin and may indicate other components packetized in the containerization object 182. For example, in various embodiments, container flag 184 may include indicia of one or a combination of: an identifier of the content item 176 in the container, boundaries of the set of one or more audio and/or video packets that form the content item 176, access and reference to one or more other containerization specifications 186, access and reference to other metadata 188, and/or the like. The content item identifier may correspond to a field with parameters that identifies the content item 176. Further, the composite build engine 240 may configure the containerization object 182 to include the containerization specifications 186 to facilitate performance of a set of one or more operations by the one or more endpoint media devices 116 with respect to the content item 176 consequent to the one or more endpoint devices 116 receiving the content composite 180. In various embodiments, the containerization specifications 186 may include one or a combination of instructions, metadata, personalization content or instructions to fetch personalization content, and/or the like to specify and facilitate performance of the set of one or more operations by an endpoint media device 116. In some embodiments, the container flag 184 may include indicia of one or more content items 177 of the composite 180 that may include one or a combination of: identification/referencing of the content items 177, and specifications for the configuration and adaptation with the content items 177 including any one or a combination of the audio and/or video configuration aspects disclosed herein. In some embodiments, the containerization specifications 186 may include instructions for configuring the composite 180 and content item 176 with one or more content items 177. In some embodiments, the containerization specifications 186 may include one or more particularized content items 177 or instructions to fetch one or more content items 177.

Accordingly, the content composite 180 may include the content item 176 and the containerization object 182. Further, in various embodiments, the content composite 180 may include one or more particularized content items 177 at the time the content composite 180 is transmitted to one or more endpoint media devices 116, separate from or grafted into the content item 176 such that the content item 176 is an adapted content item 176 adapted with the one or more particularized content items 177. In some embodiments, the content composite 180 may not include a particularized content item 177 at the time the content composite 180 is transmitted to one or more endpoint media devices 116. In such instances, the particularized content item 177 may be fetched per the containerization specifications 186 from the system 102, 200, another data source 103, or from storage of the endpoint media device 116, and may be used by an endpoint media device 116 to adapt the content item 176. The containerization specifications 186 may include instructions and build specifications according to which the endpoint media device 116 may merge the pulled/retrieved particularized content item(s) 177 with the content item 176. As part of the instructions and build specifications, the containerization specifications 186 may specify that the particularized content item 177 (e.g., a particular redeemable content item, promo code, matrix code such as a QR code, trailer, movie content, and/or the like) contain one or more date and/or time attributes (e.g., a time stamp) indicate of one or a combination of when the item was created, when the item is to be output by the endpoint media device 116 for display, when an interface element at the endpoint media device 116 corresponding to the item is selected, when the item is stored by the endpoint media device 116 (e.g., in a digital wallet), and/or the like. In some embodiments, the one or more date and/or time attributes may be stored with the metadata 188.

In various embodiments, the content composite 180 may further include personalization content 177. The personalization content 177 may be audio, video, and/or textual content personalized to the end user of the endpoint media device 116 at the time the content composite 180 is transmitted to one or more endpoint media devices 116, separate from or grafted into the content item 176 such that the content item 176 is an adapted content item 176 adapted with the personalization content. In some embodiments, the content composite 180 may not include personalization content at the time the content composite 180 is transmitted to one or more endpoint media devices 116. In such instances, the personalization content may be fetched per the containerization specifications 186 from the system 102, 200, another data source 103, or from storage of the endpoint media device 116, and may be used by an endpoint media device 116 to adapt the content item 176 according to instructions and build specifications of the containerization specifications 186. In some embodiments, the fetched personalization content may be in one form and may be converted by the endpoint media device 116 into a different form. For example, textual content may be extracted from the retrieved personalization content (e.g., a list of items to acquire with a shopping list) in a file on the media device 116, and the textual content may be reformatted and/or transcribed to audio for inclusion in the composite 180 and presentation in the audio form along with the video and other audio of the composite 180.

In some embodiments, the subsystem 111 may transmit the content composite 180 to one or more endpoint media devices 116, and, in some embodiments, may broadcast the content composite 180 to a plurality of endpoint media devices 116. The subsystem 111 may transmit the content composite 180 in accordance with composite transmission specifications. The composite transmission specifications may at least partially specify transmission parameters that govern transmission of the containerization object 182 in a data stream with the set of one or more audio and/or video packets in audio and/or video streams corresponding to the content item 176.

The content item 176 may correspond to a specific unit within the content stream. The specific unit in the content stream may correspond to a section of the video stream that includes the set of one or more audio and/or video packets for the content item 176, which may or may not include one or more content item 177 in various embodiments (where the content item 176 may be already adapted with the item(s) 177 or may be sent with a selected set of item(s) 177 for later adaptation with one or more of the set). The composite transmission specifications may specify how the containerization object 182 should be transmitted in the data stream with the content item 176, how many instances of the containerization object 182 should be created and transmitted, how some instances of the containerization object 182 should be time/place shifted in advance of the packets corresponding to the content item 176, and/or the like. Thus, the composite transmission specifications may provide for one or more instances of the containerization object 182 particularized for the individual content item 176 to be transmitted within the data stream of the content stream, with the content item 176 transmitted in the audio and/or video stream(s). Accordingly, a number of instances of the containerization object 182 with the content item identifier, as specified by the composite transmission specifications, may be embedded in a section of the data stream that indicates the content item 176. Not only may the containerization object 182 with the container flag 184 be carried as a data stream with the audiovideo content stream, flagging the content item 176, it may also be replicated and encoded in a carousel manner per the composite transmission specifications to facilitate pick-up mid-stream of the content item 176, and/or in advance of the content item 176 in the stream to facilitate forward identification of the upcoming content item 176. The container flag 184 and its indicia may be encrypted and transmitted to the endpoint media device(s) 116 in the encrypted state with the content composite 180. Additionally or alternatively, the containerization specifications 186 may be encrypted and transmitted to the endpoint media device(s) 116 in the encrypted state with the content composite 180. Accordingly, disclosed embodiments may add an encrypted container flag 184 to the content item 176.

In various embodiments, the encrypted container flag 184 may govern access by the endpoint media device 116 to one or more other components of the content composite 180, including the personalization content. Consequent to delivery of the content composite 180 to the endpoint media device 116, the endpoint media device 116 may decrypt the encrypted container flag 184. Once the endpoint media device 116 decrypts the container flag 184, the endpoint media device 116 may have access to, for example, the metadata of the content composite 180, such as the instructions of the containerization specifications 186, other containerization specifications 186, and/or the other metadata 188. The container flag 184 may include indicia that identifies the state and extent of one or more layers of encryption of the content composite 180. One or more of the components of the content composite 180 may be encrypted. The encryption may include a lightweight, point-to-point encryption for specific components of the content composite 180, which may be advantageous to avoid bogging down processing in view of relatively heavier processing needs for video of content items 176 and generally shorter durations of content items 176.

The indicia may flag one or more objects and/or containers for the specific unit(s) within the content stream without the entire data stream being encrypted. The subsystem 111 may all or part of content composite 180 contingent on the extent of the personalization of the content composite 180. For example, when the content composite 180 is transmitted with personalization content, the personalization content may be encrypted. As one example out of many possibilities, when a content item 176 is adapted with a list (in graphical and/or audio form) of items to acquire prepared for an identified viewer, at least the portion of data corresponding to the list may be encrypted, whereas the balance of the content item 176 that is not personalized may not encrypted. Accordingly, a partially customized content composite 180 and/or content item 176 may only be partially encrypted. However, a highly customized content composite 180 and/or content item 176 may be entirely or substantially entirely encrypted, commensurate with the extent of the customization for the identified viewer. For example, if the content item 176 is due to an identified viewer selection (say, a prior procurement, such as the viewer having obtained access permissions to a movie or other particular content), then, after scraping an ID that a viewer has allowed such, the content composite 180 and/or content item 176 (which, for example, may be directed to opening up 1-to-1 connection to access a digital ticket, access to a digital copy of the content, bonus content, a content item that requires tracking such as a redeemable content item for a pay-per-view, etc.) may be entirely or substantially entirely encrypted. Such content may be highly customized and may include watermarking. One or more particularized content items 177, for example, may include watermarks for merging with content items 176 as disclosed herein.

The content composites 180 may provide for advantages with greater layers within a content stream more based around computer language. In some embodiments, various options for content items 176, 177 may be broadcasted, with only a subset of the content items 176, 177 being presented by particular endpoint media devices 116. The indicia of the container flags 184 of the content composites 180 may allow for filtering the content composites 180 according to attributes of the endpoint media device 116 and/or the endpoint viewer so the matching composite 180 is presented to the identified viewer/viewer type, pursuant to the differentiated interaction with mobile app, etc. For example, flag indicia may include layer flag indicia that indicates this content item is for unlocked devices or only locked devices. One layer may allow for identifying different types of the endpoint media devices 116 that differ in capabilities, which, in some embodiments, may be determining based at least in part on pulling information (e.g., device specifications) from the particular endpoint media device 116. Such device type identification may further allow for selectively providing a type of endpoint media device 116 with different types of content items 176, 177 and different content attributes as a function of the device type. For example, such selective provisioning may include filtering content items 176, 177 based at least in part on the differences in frame rate of the content items 176, 177 as a function of the endpoint media device type and/or capabilities. Different content items 176, 177 may be filtered for different endpoint media device 116 (e.g., content items 176, 177 with frame rates associated with fast-changing content may not be mapped to devices with lesser capabilities). As another example, such selective provisioning may include filtering content items 176, 177 based at least in part on the differences in how the content items 176, 177 are compressed as a function of the endpoint media device type and/or capabilities.

One layer may allow for filtering one or a combination of the content composite 180, the content item 176, the particularized content item 177, and/or the personalization content based at least in part on the authentication and identification of the endpoint viewer, e.g., based at least in part on observation data. For example, such filtering may include selecting and presenting the content composite 180, the content item 176, the particularized content item 177, and/or the personalization content that correspond to one or more demographics of the identified viewer (e.g., age, marital status, children, pets, renter, homeowner, etc.) and/or viewer type (e.g., flag indicia of NC-17, MA, or another rating so an endpoint device with parental specifications would be provided with appropriate content items). As another example, such filtering may include selecting and presenting the content composite 180, the content item 176, the particularized content item 177, and/or the personalization content that correspond to identified past actions mapped to the endpoint and/or endpoint media device 116. This can result in such differences as presenting content that is directed to, say, "get video subscription service X" versus "because you have video subscription service X, . . . Y." Another layer may allow for creating a backchannel to facilitate communications, ordering, secure video delivery, and/or the like disclosed herein.

In some embodiments, the container flag 184 and/or containerization specifications 186 may prompt the endpoint media device 116 to execute the instructions to perform at least one operation of the set of one or more operations facilitated by the containerization object 182. In some embodiments, APIs may be used to instruct the endpoint media device 116 as to what to do with the container flag 184 and/or containerization specifications 186. In some embodiments, the container flag 184 and/or containerization specifications 186 may allow for invoking, waking up, opening, and/or otherwise activating an application of the endpoint media device 116 responsive to the decryption of the container flag 184 and/or containerization specifications 186, in some instances, when the application is offline with respect to the system 102, 200, and/or another system 103. This may include activating an application on an endpoint device 116 and prompting the saving of the ecoupon or promo code (which may be in audio form) in the endpoint device 116. Such prompting may be performed at least in part by audio cues and commands directed to a virtual assistant of a nearby endpoint device 116 (e.g., a smart speaker) with audio indicia of the item.

For example, the container flag 184 and/or containerization specifications 186 may include a read flag that triggers one or more return channel communications. The corresponding instructions may instruct the endpoint media device 116 to report to the system 102, 200, and/or another system 103 with one or more return channel communications one or a combination of: that the content item 176 adapted with one or more content items 177 was received by the endpoint media device 116; that the adapted content item 176 was presented with a display device at the endpoint media device 116; to what extent the adapted content item 176 was presented (in full or to what lesser extent in percentage or another suitable metric); that the adapted content item 176 was shown to an intended endpoint user, detection of one or more operations executed consequent to the presentation (e.g., audio transcription of a code or ecoupon to an application of the media device 116 and/or another smart device, scanning a matrix code, loading a redeemable content item and/or particularization content into a mobile app such as a digital wallet of the endpoint media device 116, utilizing the particular content items 177 such as to order a service, etc.) and metrics of the operations (e.g., time of execution); and/or the like. Further, the return channel communications may include one or a combination of: indicia of a particular endpoint user and/or type of endpoint user using the endpoint media device 116 within a time period before and/or when at least part of an adapted content item 176 is/was output for display; indicia of endpoint media device 116 capabilities (e.g., device specifications); indicia of authentication bases such as a SIM card of a mobile device, television receiver with a smartcard, and/or similar identification that can be used to authenticate to set up account; and/or the like.

The return channel communications may contribute to the observation data 229 and repeated, iterative feedback loop features disclosed further herein. The containerization specifications 186 may instruct the endpoint media device 116 to report back upon occurrence of each state change and/or to report back per a reporting schedule (e.g., just prior to closure of an application, at end of day, at the end of another reporting period, etc.). In various embodiments, the container flag 184 and/or containerization specifications 186 may include one or more encrypted messages, hashes, and/or the like that each indicate one or more of the above reporting events. Accordingly, the instructions may specify that each return channel notification include a corresponding encrypted message, hash, code, and/or the like, which the system 102, 200, and/or another system 103 may process to verify the respective reporting event and metrics thereof.

In instances where the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like), the notifications may contain indicia of one or a combination of the content item 177, the endpoint device 116, the user associated with the endpoint device 116, a location associated with the use of the content item 177, a date and/or time associated with the use of the content item 177, and/or the like. Having received such indicia from a service provider system 103, the subsystem 111 (e.g., the matching engine 238) may correlate the indicia to records stored in a database 222 with identifiers of one or a combination of the content item 177, the endpoint device 116, the user and/or account associated with the endpoint device 116, a location associated with the user, account, and/or endpoint device 116, and/or date and/or time associated with the delivery and/or presentation of the content item 177. The identified correlations may contribute to the observation data 229 and feedback loop features.

In some embodiments, where the content item 176 is not already adapted with the particularized content item 177, the set of one or more operations may include identifying the particularized content item 177 and adapting the content item 176 with the particularized content item 177. When the particularized content item 177 is not included in the content composite 180 when the content composite 180 is received by the endpoint media device 116, the set of one or more operations may include pulling the particularized content item 177 from the system 102, 200, another data source 103 per the containerization specifications 186. In some embodiments, the particularized content item(s) 177 may be transmitted separately from the system 102, 200 and/or another data source 103 prior to the delivery of the content composite 180 such that the endpoint media device 116 stores the particularized content item(s) 177 locally. In such instances, the set of one or more operations may include retrieving the matching particularized content item 177 from storage of the endpoint media device 116 per the containerization specifications 186. Further, in some embodiments, when the particularized content item 177 is not transmitted with the content item 176, the containerization specifications 186 may specify first checking local storage of the endpoint media device 116 for the matching particularized content item 177 and only pulling the particularized content item 177 from the system 102, 200 and/or another data source 103 when the particularized content item 177 is not available from the local storage.

Similarly, the set of one or more operations may include identifying the personalized content 177 that is particular to one or more viewers and adapting the content item 176 with the personalized content 177. As disclosed herein, in some embodiments, the particularized content item 177 may include personalized content 177. In such instances, the adapting of the content item 176 with the particularized content item 177 may include adapting of the content item 176 with personalized content 177. Additionally or alternatively, personalized content may be separate from the particularized content item 177. Hence, where the content item 176 is not already adapted with the personalized content, the personalized content may be included in the content composite 180 when the content composite 180 is received by the endpoint media device 116. When the personalized content is not included in the content composite 180 when the content composite 180 is received by the endpoint media device 116, the set of one or more operations may include retrieving/pulling the personalized content from one or a combination of local storage of the endpoint media device 116, the system 102, 200, and/or another data source 103 per the containerization specifications 186. The containerization specifications 186 may specify first checking local storage of the endpoint media device 116 for the matching personalized content and then pulling the personalized content from the system 102, 200 and/or another data source 103 when at least some of the personalized content is not available (or when sufficient personalized content of one or more specified types is not available) from the local storage or when supplemental personalized content is identified as requested per the containerization specifications 186.

To facilitate the content composite 180, the composite build engine 240 may include a metadata handler 208 that may generate metadata (e.g., one or more tags) corresponding to identifiers, attributes, characteristics, and/or categories of programming content 202, adaptable content items 176, and/or particularized content items 177. In some embodiments, the composite build engine 240 may assign packet identifiers to identify data of the content that is to be transmitted as part of a data stream to an endpoint media device 116 and that is to be associated with one or more tags. Data transmitted as part of a data stream to an endpoint media device 116 may be packetized and assigned packet identifiers. A particular packet identifier may be associated with data packets related to tags for particular segments of programming content 202, adaptable content items 176, and/or particularized content items 177.

The content matching engine 238 may identify particular content in the programming content 202 and may identify one or more corresponding identifiers, attributes, characteristics, and/or categories of programming content 202, adaptable content items 176, and/or particularized content items 177 of one or more adaptable content items 176 and/or one or more particularized content items 177. Based at least in part on such identification, the composite build engine 240 may create metadata, which, in some embodiments, may correspond to tag data. Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers. For example, the metadata for the particular content may identify the particular content (e.g., show, movie, etc.). The metadata may further identify one or more attributes of the particular event (e.g., any suitable identifier for the participating entities, the location of an event, and/or the like). In some embodiments, at least a portion of the metadata augmentation may be performed at the content provider system 102 such that one or more tagged composite components may be is provided to an endpoint media device 116. Subsequently, the endpoint media device 116 may identify composite components, for example, by processing the metadata.

The metadata for adaptable content items 176 may, for example, identify the adaptable content items 176 as being adaptable with any suitable identifier, such as a flag, field value, etc. Additionally or alternatively, the metadata for the adaptable content items 176 and/or 177 may identify with any suitable identifier that the adaptable content items 176 and/or 177 are designated for a certain event/programming content, geolocation, category of events/programming content, types of content (e.g., ratings for different audience designations, content designations, etc.), types of programs and/or viewers, language/dialect, and/or the like. The metadata for the adaptable content items 176 and/or 177 may further identify one or more attributes of the particular event (e.g., any suitable identifier for associated entities, location, a temporal attribute such as a time of an event, and/or the like). Additionally or alternatively, the metadata for the adaptable content items 176 may identify transition points, hooks, frames, windows, other portions designated for overlays, and/or the like for merging with content items 177 such that content from the content items 177 is merged at the transition points, hooks, frames, windows, other portions designated for overlays, and/or the like.

In some embodiments, metadata-augmented adaptable content items 176 may be provided by the service provider system 102 to the endpoint media devices 116, after which the endpoint media devices 116, each having at least a portion of the content composite subsystems 111, may process and use the metadata to facilitate matching adaptable content items 176 with corresponding programming content 202. Likewise, the endpoint media devices 116 may process and use the metadata to facilitate matching adaptable content items 176 with corresponding content items 177. Thus, the metadata may facilitate the endpoint media devices 116 appropriately providing content composites 180 corresponding to certain contextual factors for display with appropriate placement with respect to televised events, shows, etc. at commercial breaks and/or during presentation of the televised events, shows, etc.

In a similar manner, metadata for particularized content items 177 may, for example, identify a corresponding show, geolocations, categories of events/programming content, types of content (e.g., ratings for different audience designations, content designations, etc.), types of programs and/or viewers, languages/dialects, and/or the like. The metadata for the content items 177 may further identify fields and content for one or more attributes, such as phone numbers, email addresses, addresses, descriptors, URLs and hyperlinks to platforms and websites and/or sites for further information, ordering, and/or the like. In some embodiments, at least a portion of the metadata augmentation may be performed at the service provider system 102 and/or the service provider system 103 with respect to the particularized content items 177. Subsequently, the content composite subsystem(s) 111 and/or endpoint media devices 116 may process and use the metadata to facilitate matching adaptable content items 176 with corresponding content items 177. In some embodiments, the devices 116, having at least a portion of the content composite subsystem 111, may process the particularized content items 177 in the form in which they are received (e.g., directly from a service provider 103) and, based on such processing, may match content items 176 with corresponding content items 177.

Referring again more particularly to FIG. 2, the matching engine 238 may be configured to match adaptable content items 176 to segments of programming content 202 based at least in part on metadata at a service provider system 102 side or at a device 116, in accordance with various embodiments. For example, metadata may be extracted when or before a given segment of programming content 202 is to be output for display and before a transition point. In some embodiments, the matching engine 238 may read the metadata mapped to the segment and perform a search of the repositories 222 for one or more adaptable content items 176 that have metadata matching the extracted metadata with respect to one or more of event identification, event category identification, and/or temporal identification, with the highest preference given to the adaptable content item 176 that has metadata most closely matching the metadata of the previous segment. Alternatively, the matching engine 238 may read the metadata mapped to the segment and pull one or more adaptable content items 176 from the service provider system 102. In so doing, the subsystem 111 may transmit at least a portion of the metadata of the programming content 202 to the service provider system 102 in order to facilitate matching the extracted metadata with one or more adaptable content items 176 with respect to one or more of event identification, event category identification, and/or temporal identification. Some embodiments may include the subsystem 111 configured to perform a search of the repositories 222 for one or more adaptable content items 176 that have metadata matching the extracted metadata in addition to pulling one or more adaptable content items 176 from the service provider system 102. For example, the subsystem 111 may first perform a search of the repositories 222 for any matching adaptable content items 176 and then only pull one or more adaptable content items 176 from the service provider system 102 when no adaptable content items 176 are found in the search of the repositories 222 that match the extracted metadata with a sufficient match score that indicates a level of correlation satisfying a correlation threshold. Accordingly, certain embodiments may facilitate matching of adaptable content items 176 to segments of programming content 202 based at least in part on metadata.

In a similar manner, the matching engine 238 may be configured to match particularized content items 177 to one or more of content items 176, segments of programming content 202, geolocations, categories of events/programming content, types of content (e.g., ratings for different audience designations, content designations, etc.), types of programs and/or viewers, languages/dialects, and/or the like, in accordance with various embodiments. For example, in some embodiments, the matching of one or more particularized content items 177 may be based at least in part on metadata. The metadata may be extracted and read when or before a given content item 176 and/or a given segment of programming content 202-1 is to be output for display, and, before a transition point, may be mapped to the content item 176 or the segment. In some embodiments, the matching of one or more particularized content items 177 may be based at least in part on identified characteristics of a given content item 176, a given segment of programming content 202, geolocations, categories of events/programming content, types of content (e.g., ratings for different audience designations, content designations, etc.), types of programs and/or viewers, languages/dialects, and/or the like. The matching engine 238 may take the identified characteristics as cues to retrieve one or more content items 177 and/or one or more corresponding adaptable content items 176 and for the content splicing engine 242 to output one or more content composites 180 for presentation. The timing of the presentation may be after the segment of programming content 202 (e.g., at a commercial break), during the segment of programming content 202 (e.g., as an overlay, in a side window/frame, etc.) to match the identified characteristics of the programming content 202, or after the presentation of a first composite 180 (e.g., when one or more content items 177 and/or one or more corresponding adaptable content items 176 are selected for presentation as a subsequent composite 180 or for separate provisioning to the device 116 in accordance with various embodiments disclosed herein such as transferring to an account accessible by a user of the endpoint media device 116). In various embodiments, the characteristic identification may include one or a combination of text recognition, image recognition, and/or audio recognition. For example, the matching engine 238 may recognize text (which may include language and dialect) from the metadata of content items 176 and/or programming content 202. As some possible examples out of many possibilities, the matching engine 238 may recognize indicia of uniform resource identifiers (e.g., URLs), identifiers of provider systems 103, and/or the like from the metadata (which may include closed captioning information) that the matching engine 238 may map to provider systems 103.

To facilitate image recognition, some embodiments of the content composite subsystem 111 (e.g., by way of the matching engine 238) may be configured to detect one or more color characteristics in content items 176 and/or programming content 202, which may include any suitable color characteristic that may be measured to recognize alpha and/or numerical portions of the images and/or objects in the images. From such portions and/or objects, the matching engine 238 may recognize uniform resource identifiers (e.g., URLs, web addresses, etc.), phone numbers, identifiers of provider systems 103, logos, graphics displayed with streaming tickers or overlays typically positioned and/or scrolling across a portion of the display area, and/or the like which the matching engine 238 may map to provider systems 103. The matching engine 238 may include an image analyzer and handling module to facilitate that detection. By way of example, the matching engine 238 may detect one or more color characteristics in programming content 202 by way of any one or combination of pixel identification, detecting color component values, detecting color codes, and/or the like. Some embodiments may sample only portions of images, such as only part of a frame (which could, for example, be specified by identification of pixel coordinates and ranges thereof to define areas of interest). Some embodiments may sample only a central portion of a frame. Other embodiments may only sample a non-central portion, such as a border portion of a frame. Some embodiments may start with one portion of a frame and only sample to until a recognition is achieved.

To facilitate audio recognition, the content composite subsystem 111 (e.g., byway of the matching engine 238) may be configured to detect one or more audio characteristics in content items 176 and/or programming content 202. The matching engine 238 may include an audio analyzer and handling module to facilitate that detection. By way of example, the matching engine 238 may detect one or more audio characteristics (which may include language and dialect) in content items 176 and/or programming content 202 by way of any one or combination of analyzing audio, applying voice recognition, acoustic spectrum analysis, analyzing the audio tracks metadata track, comparison to acoustic profiles for types of content, and/or the like. Some embodiments of the content composite subsystem 111 may store acoustic profiles mapped to types of content items 176 and/or programming content 202 and corresponding provider systems 103 in the repository 222. Each acoustic profile may specify one or more selected values of acoustic metrics as distinctive markings and/or acoustic categories 214 (e.g., language, dialect, music, scores, jingles, voice characteristics, and/or the like) as characteristics of the types of content items 176 and/or programming content 202 and corresponding provider systems 103.

As another example, the subsystem 111 may recognize one or more keywords from dialogue that the matching engine 238 may map to language and dialect. The matching engine 238 may identify one or more keywords and/or expressions in the dialogue as a dialogue impression for the purposes of characterizing the sample and identifying content items 176 and/or 177. The matching engine 238 may compile the keywords and/or expressions of the sample and retain the keywords and/or expressions and corresponding content items 176 and/or 177. In some cases, the matching engine 238 may correlate the dialogue impression to one or more dialogue categories 212 for similar dialogue impressions and corresponding content items 176 and/or 177. In various embodiments, the correlation may be based at least in part on matching selected keywords and/or expressions to identical and/or similar keywords and/or expressions specified for certain dialogue categories 212 and corresponding content items 176 and/or 177. The dialogue categories 212 may include categorizations of concept, keyword, expression, and/or the like mapped to corresponding content items 176 and/or 177. Based at least in part on the dialogue impression, the matching engine 238 may create a dialogue profile for programming content 202 and corresponding content items 176 and/or 177. The dialogue profile may be retained in any suitable form, such as a file, a list, etc. The content composite subsystem 111 may store dialogue profiles mapped to content items 176 and/or 177 and/or programming content 202 in the repository 222. Each dialogue profile may specify one or more selected keywords and/or expressions as distinctive markings and/or dialogue categories 212 as characteristics of the content items 176 and/or 177 and/or programming content 202.

To facilitate the matching, the matching engine 238 may perform correlation based at least in part on the text recognition, image recognition, and/or audio recognition and text, image, and/or audio categories 212. By way of example, the correlation rules 218 may include correlation criteria that could include keywords identified by any one or combination of words, word stems, phrase, word groupings, and/or like keyword information. The correlation criteria could include weightings assigned to dialogue specifications. Hence, within each dialogue bucket, a keyword could be assigned a weight according to its significance. More significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other characteristics and/or keywords, and/or not in conjunction with others. Similar correlation criteria may be used for acoustic impressions. In some embodiments, the matching engine 238 may employ a scoring system to quantify correlations with a numerical expression, for example, a match score, with higher scores being assigned to higher correlations. Higher scores may be assigned for greater extents of matching. By way of example with respect to dialogue, a match of three dialogue cues or dialogue categories may be assigned a higher score than a match of only one top dialogue cue and/or dialogue category. As another example, an exact match of words, expressions, and/or dialogue categories may be assigned a higher score than a complimentary match (e.g., where absent an exact match, a word, expression, and/or dialogue category is defined as a complement to another a word, expression, and/or dialogue category). Additional aspects, features, and details relating to the subsystem 111, the content items 176, 177, and the composites 180 are provided in application Ser. No. 16/655, 104, incorporated by reference herein.

Particularized content items 177 may be provisioned to endpoint media devices 116 in one or a combination of ways disclosed herein. For example, in some embodiments, one or more particularized content items 177 may be integrated with and audially presented with the adaptable content item 176. Such presentations of the particularized content items 177 may be captured by an endpoint media device 116 listening via a microphone integrated with or other communicatively coupled to the media device 116. Additionally or alternatively, particularized content items 177 may be transferred to an account accessible by the user of the endpoint media device 116. In various embodiments, the particularized content items 177 may be transferred to the account in audio form in full or only partially (e.g., after the subsystem 111 and/or media device 116 extracts a pertinent option, such as a promo code, from the full audio), and/or in graphical, textual, or the like form (e.g., after the subsystem 111 and/or media device 116 transcribes an audio segment portion). Additionally or alternatively, particularized content items 177 may be provisioned to a device 116 by way of one or combination of application installed on the device 116, communications from a receiver 116e, communications from the service provider system 102, a near field communication interface (e.g., contactless interface, Bluetooth, optical interface, etc.), wireless communications interfaces capable of communicating through a cellular data network, or through Wi-Fi, such as with a wireless local area network (WLAN), and/or the network 120. By way of example, a composite 180 may be presented via a television receiver 116e on a display 160 with one or more user-selectable options that allow redirection of composites 180 and/or particularized content items 177 to a secondary device 116 consequent to user selection. Further, one or more user-selectable options may be presented to the user via the receiver 116e and/or device 116 to allow content composite 180 and/or particularized content item 177 provisioning to a secondary device 116 concurrently with the presentation of the televised content segment. As disclosed herein, the user-selectable options may include one or more options to transition provisioning of one or more composites 180 to a secondary device 116 and/or to request notifications from the one or more platforms, websites, and/or sites be sent to the secondary device 116 so that the secondary device 116 may be used to interact with the platforms and sites via an application installed on the secondary device 116. In that way, a user may interact with the one or more platforms and sites via the secondary device 116 while viewing the televised event on a primary display associated with a receiver 116e and/or primary device 116.

As illustrated by FIG. 2, the content processing subsystem 111 may include a learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of observation data including viewer pattern data 216. As disclosed herein, the subsystem 111 may determine a program, show, etc. that the viewer actually is viewing, is about to view (e.g., the televised event is specified to play on the channel that the viewer is currently viewing), or is likely to view as determined with the learning engine 239. The subsystem 111 may further determine a type of audiovisual content (e.g., ratings for different audience designations, content designations, etc.) and intra-content metrics corresponding to indicia or specifications of languages and dialects of dialogues and/or text within the content and/or selected closed captioning. The subsystem 111 may push information indicative of the content, content type, and/or metrics to one or more service provider systems 102 and/or 103. In some embodiments, the service provider system 102 may select one or more content items 176, 177 matching the content segment for transfer to the subsystem 111 which, as disclosed herein, may be a part of the content provider system 102 and/or may be part of the receiver 116e and/or devices 116. The subsystem 111 may select from the one or more adaptable content items 176, 177 as matching particular segments of the televised segment and, utilizing the content splicing engine 242 in some embodiments, may output one or more corresponding content composites 180 for presentation after the particular segments and/or simultaneously with the particular segments.

In various embodiments, one or more of the service provider systems 102, 103 may select one or more particularized content items 177 matching the televised event for transfer to the subsystem 111. In some embodiments, one or more of the service provider systems 102, 103 may select a set of one or more particularized content items 177 for transfer (e.g., based on recency of information updates corresponding to the content items 177) for transfer to the subsystem 111, and the subsystem 111 may determine which content items 177 from the set match the televised content segment. As disclosed above, the content composite subsystem 111 may include a matching engine 238 that may include logic to implement and/or otherwise facilitate any taxonomy, classification, categorization, correlation, mapping, qualification, scoring, organization, and/or the like features disclosed herein.

Figure 4:
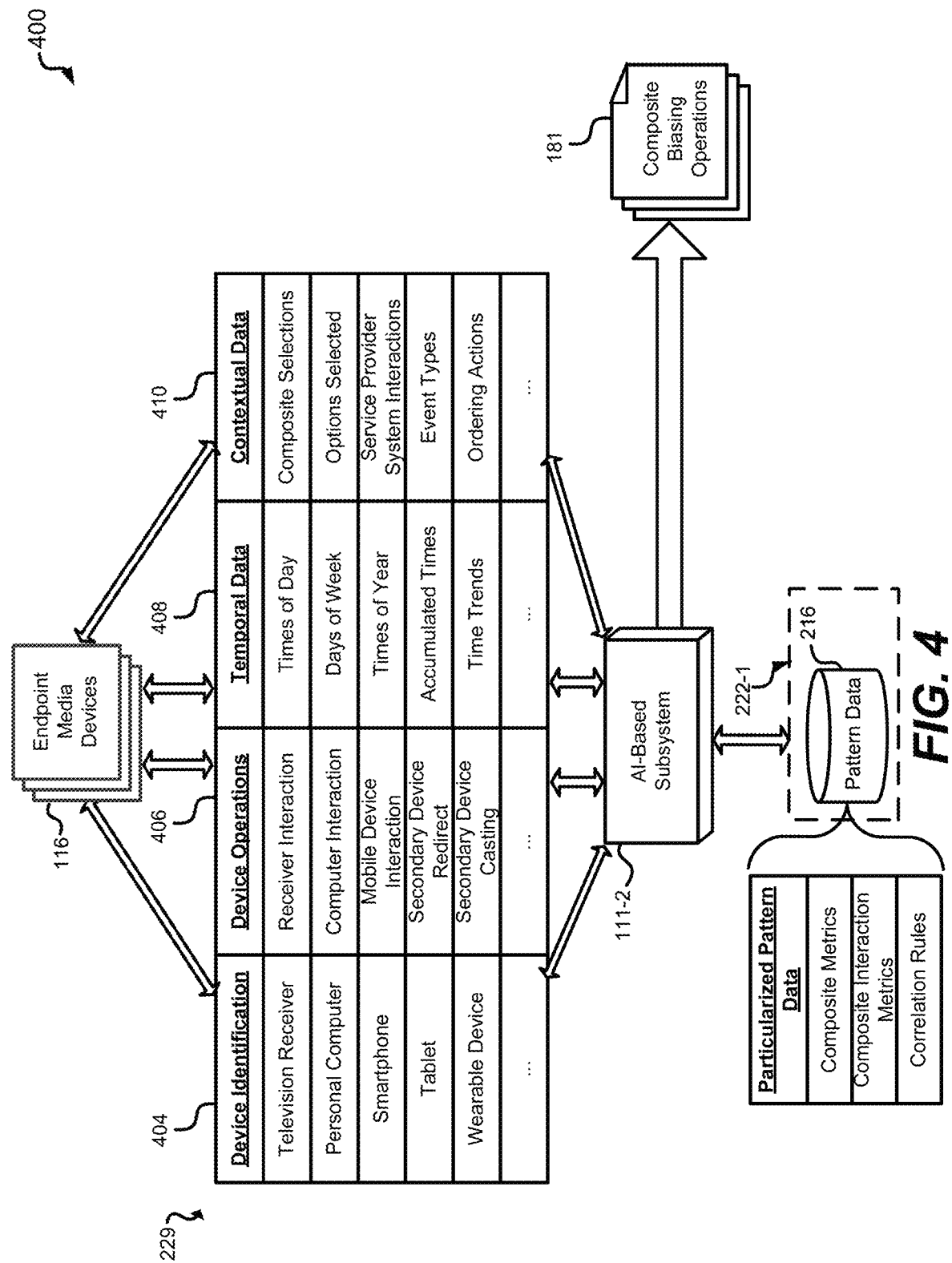
FIG. 4 illustrates certain aspects of subsystem data flow, in accordance with disclosed embodiments of the present disclosure.

FIG. 4 illustrates certain aspects of the artificial-intelligence-based subsystem data flow 400, in accordance with various embodiments of the present disclosure. The content processing subsystem 111 may be configured to gather observation data 229, which may be specific to one or more particular identified users and/or may be generally related to particular endpoint media devices 116. The observation data 229 may be gathered from one or more devices 116, aggregated, consolidated, and transformed into viewer pattern profiles that include personalized pattern data 216.

In embodiments where the learning engine 239 is included in an endpoint media device 116, the device 116 may be a self-observer that may additionally gather additional observation data 229. In various embodiments, the data from the one or more devices 116 may be retrieved and/or received by the content processing subsystem 111 via one or more data acquisition interfaces, which may include interfaces of the content processing subsystem 111, the one or more endpoint media devices 116, and/or the like-through network(s) 120 in various embodiments, through any suitable means for direct communication, and/or through any other suitable means of transferring data. According to various embodiments where the subsystem 111 is included in a service provider system 102, observation data 229 may be actively gathered and/or pulled from the one or more endpoint media devices 116. As disclosed herein, in various embodiments, the one or more data acquisition interfaces may include one or more APIs that define protocols and routines for interfacing with the one or more endpoint media devices 116 and which may specify API calls to/from one or more endpoint media devices 116. In various embodiments, the APIs may include a plug-in to integrate with an application of one or more endpoint media devices 116. The API translation profiles may translate the protocols and routines of the data source component and/or system to integrate at least temporarily with the system and allow one-way communication to the system 102 and/or two-way communication with system 102 in various embodiments by way of API calls.

Some embodiments of the subsystem 111 may aggregate observation data 229 to derive device identification data 404, device operations 406, temporal data 408, and/or contextual data 410. The device identification data 404 may include any suitable data for identifying and tracking particular receivers 116e and devices 116; associated accounts, subscribers, and viewers; and/or the like disclosed herein. The device operations data 406 may include any suitable data for identifying and tracking device operations and interactions as those disclosed herein. The contextual data 410 may include metrics and patterns of viewer interactions/responses pursuant to provisioning of content composites 180 and service provider system 103 biasing 181. For example, viewer responses to content composites 180 provisioning may include indications of whether the viewer selected a user-selectable options provided with content items 177 and composites 180, the types of such selections, and/or types of consequent interactions with service provider systems 103. For example, the metrics and patterns may take into account whether the viewer opted out of content composites 180, whether the viewer selected links of composites 180 to interact with the platforms and sites of one or more service provider systems 103, whether the viewer selected options to redirect content composites 180 and/or notifications from service provider systems 103 to a secondary device 116, which options and/or service provider systems 103 the viewer selected, whether the viewer used redeemable content items, promo codes, QR codes, etc. and the types of the viewer's orders, purchases, and other interactions with service provider systems 103, and/or the like. The temporal data 408 may include metrics such as any information to facilitate detection, recognition, and differentiation of one or combination of temporal factors correlated or which the content processing subsystem 111 correlates to other observation data 229 such as device identification data 404, contextual data 410, and/or the like. For example, the temporal data 408 may include time of day information, time of week information, time of year information, holiday information, etc. when the viewer made selections, orders, purchases, redemptions of redeemable content items, offers, promo codes, etc.; and/or the like.

The learning engine 239 may map one or a combination of the various extra-composite metrics of the observation data 229 to the metrics of the particular composites 180 provided to a particular viewer. Based at least in part on taking into account such observation data 229 as part of an iterative feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem ill may be configured to employ machine learning to process the observation data 229 and the content items 180 and to derive and develop the personalized pattern data 216. The content processing subsystem 111 may be configured to employ deep learning to process the observation data 229 and the content items 180 and to derive and develop the personalized pattern data 216. The learning engine 239 may be configured to perform any one or combination of features directed to matching or otherwise correlating the observation data 229—such as the device identification data 404, the device operation identification data 406, the temporal data 408, the contextual data 410, descriptive information of the content items 180, and/or the like—with intra-content metrics of the content items 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238. The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content items 176 and/or content items 177 (e.g., which may be based at least in part on the metadata features disclosed herein) for content composite 180 creation and adaptation. For example, the learning engine 239 may learn that a particular viewer tends to interact with certain types of content composites 180. Such interaction object type differentiation may be on the macro level, such as recognizing that a viewer tends to interact more with content composites 180 that are directed to audio adaptions with audio content items 177 more than with content composites 180 that are directed to audio adaptions with audio content items 177. Further, viewer interaction differentiation may be on the micro level, such as recognizing that a viewer tends to interact more with composites 180 directed to content items 117 corresponding to certain types of offers, redeemable content items, promotions, etc. Still further, the learning engine 239 may learn that a particular viewer tends to interact with content composites 180 that are directed to audio content items 177 in a certain language and dialect. Even further, the learning engine 239 may learn that a particular viewer tends to interact with content composites 180 where the content items 177 are temporally positioned near the beginning of the respective content items 176 for presentation primacy and/or with content composites 180 where the content items 177 are temporally positioned near the ending of the respective content items 176 for presentation recency. Accordingly, based at least in part on one or a combination of such learnings for a particular viewer, the subsystem 111 may bias the selection, creation, and/or adaptation of content composites 180 toward the types, configurations, and/or positioning of content items 177 that tend to elicit viewer interaction, and decrease or cease the selection, creation, and/or adaptation of content composites 180 toward other types, configurations, and/or positioning of content items 177.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Further details regarding embodiments of receivers corresponding to receivers 116e and of computing devices 116 that make use of, interact with, and/or at least partially include the subsystem 111 are disclosed in the applications incorporated by reference herein. Likewise, further details regarding a computer system that may be incorporated as part of the previously described computerized devices, such as a television receiver 116e, device(s) 116, and/or content provider system 102 are disclosed in the applications incorporated by reference herein. Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques and features. Various changes may be made in the function and arrangement of elements without departing from the spirit or scope of the disclosure.

What is claimed:

1. A method for audio adaption of content items to device operations of an endpoint media device, the method comprising:
    processing, by one or more processing devices, a first set of observation data corresponding to indications of detected media device operations associated with a first media device and mapped to a first set of content items;
    receiving, by the one or more processing devices, a first content composite comprising an adaptable content item corresponding to a set of one or more audio and/or video packets corresponding to audio and/or video content, the first content composite from a content provider system;
    adapting, by the one or more processing devices, the first content composite with a first audio segment, the adapting comprising:
        selecting, based at least in part on the first set of observation data, the first audio segment from a plurality of audio segments; and
        configuring the first content composite with the first audio segment so that the adapted first content composite plays the first audio segment for at least part of a first presentation time when the adapted first content composite is presented;
    outputting, by the one or more processing devices, the adapted first content composite for presentation where, consequent to providing the adapted first content composite to a first endpoint media device or a second endpoint media device, the first endpoint media device or the second endpoint media device performs at least one operation relating to the adapted first content composite;
    processing, by the one or more processing devices, at least one communication received from the first endpoint media device, the second endpoint media device, or a remote system that is remote from the one or more processing devices, the first endpoint media device, and the second endpoint media device, the at least one communication indicative of the at least one operation relating to the adapted first content composite;
    adapting, by the one or more processing devices, a second content composite with a second audio segment, the adapting comprising:
        selecting, based at least in part on the at least one communication indicative of the at least one operation relating to the adapted first content composite, the second audio segment; and
        configuring the second content composite with the second audio segment so that the adapted second content composite plays the second audio segment for at least part of a second presentation time when the adapted second content composite is presented; and
    outputting, by the one or more processing devices, the adapted second content composite for presentation where, consequent to providing the adapted second content composite to the first endpoint media device or the second endpoint media device, the first endpoint media device or the second endpoint media device performs at least one operation relating to the adapted second content composite.

2. The method for audio adaption of content items to device operations of an endpoint media device as recited in claim 1, further comprising:
    receiving the plurality of audio segments from the content provider system.

3. The method for audio adaption of content items to device operations of an endpoint media device as recited in claim 2, where the plurality of audio segments are received with the first content composite.

4. The method for audio adaption of content items to device operations of an endpoint media device as recited in claim 3, where the first content composite is adapted with the first audio segment as a function of time.

5. The method for audio adaption of content items to device operations of an endpoint media device as recited in claim 4, where the first set of observation data comprises a viewer metric as a function of time, and the first content composite is adapted with the first audio segment as a function of the viewer metric.

6. The method for audio adaption of content items to device operations of an endpoint media device as recited in claim 5, where the first set of observation data comprises a current geolocation of the first endpoint media device, and the first content composite is adapted with the first audio segment as a function of the current geolocation.

7. The method for audio adaption of content items to device operations of an endpoint media device as recited in claim 6, where the at least one operation relating to the adapted first content composite corresponds to storing a code corresponding to the first audio segment by the first endpoint media device and/or the second endpoint media device.

8. A system to audio adapt content items to device operations of an endpoint media device, the system comprising:
    one or more processing devices; and
    memory communicatively coupled with and readable by the one or more processing devices and having stored therein processor-readable instructions which, when executed by the one or more processing devices, cause the one or more processing devices to perform operations comprising:
        processing a first set of observation data corresponding to indications of detected media device operations associated with a first media device and mapped to a first set of content items;

processing a first content composite comprising an adaptable content item corresponding to a set of one or more audio and/or video packets corresponding to audio and/or video content, the first content composite from a content provider system;

adapting the first content composite with a first audio segment, the adapting comprising:
selecting, based at least in part on the first set of observation data, the first audio segment from a plurality of audio segments; and
configuring the first content composite with the first audio segment so that the adapted first content composite plays the first audio segment for at least part of a first presentation time when the adapted first content composite is presented:

outputting the adapted first content composite for presentation where, consequent to providing the adapted first content composite to a first endpoint media device or a second endpoint media device, the first endpoint media device or the second endpoint media device performs at least one operation relating to the adapted first content composite;

processing at least one communication received from the first endpoint media device, the second endpoint media device, or a remote system that is remote from the one or more processing devices, the first endpoint media device, and the second endpoint media device, the at least one communication indicative of the at least one operation relating to the adapted first content composite;

adapting a second content composite with a second audio segment, the adapting comprising:
selecting, based at least in part on the at least one communication indicative of the at least one operation relating to the adapted first content composite, the second audio segment; and
configuring the second content composite with the second audio segment so that the adapted second content composite plays the second audio segment for at least part of a second presentation time when the adapted second content composite is presented; and outputting the adapted second content composite for presentation where, consequent to providing the adapted second content composite to the first endpoint media device or the second endpoint media device, the first endpoint media device or the second endpoint media device performs at least one operation relating to the adapted second content composite.

9. The system to audio adapt content items to device operations of an endpoint media device as recited in claim 8, further comprising:
receiving the plurality of audio segments from the content provider system.

10. The system to audio adapt content items to device operations of an endpoint media device as recited in claim 9, where the plurality of audio segments are received with the first content composite.

11. The system to audio adapt content items to device operations of an endpoint media device as received in claim 10, wherein the first content composite is adapted with the first audio segment as a function of time.

12. The system to audio adapt content items to device operations of an endpoint media device as recited in claim 11, where the first set of observation data comprises a viewer metric as a function of time, and the first content composite is adapted with the first audio segment as a function of the viewer metric.

13. The system to audio adapt content items to device operations of an endpoint media device as recited in claim 12, where the first set of observation data comprises a current geolocation of the first endpoint media device, and the first content composite is adapted with the first audio segment as a function of the current geolocation.

14. The system to audio adapt content items to device operations of an endpoint media device as recited in claim 13, where the at least one operation relating to the adapted first content composite corresponds to storing a code corresponding to the first audio segment by the first endpoint media device and/or the second endpoint media device.

15. One or more non-transitory, machine-readable media having machine-readable instructions thereon which, when executed by one or more processing devices, cause the one or more processing devices to perform operations comprising:

processing a first set of observation data corresponding to indications of detected media device operations associated with a first media device and mapped to a first set of content items;

processing a first content composite comprising an adaptable content item corresponding to a set of one or more audio and/or video packets corresponding to audio and/or video content, the first content composite from a content provider system;

adapting the first content composite with a first audio segment, the adapting comprising:
selecting, based at least in part on the first set of observation data, the first audio segment from a plurality of audio segments; and
configuring the first content composite with the first audio segment so that the adapted first content composite plays the first audio segment for at least part of a first presentation time when the adapted first content composite is presented;

outputting the adapted first content composite for presentation where, consequent to providing the adapted first content composite to a first endpoint media device or a second endpoint media device, the first endpoint media device or the second endpoint media device performs at least one operation relating to the adapted first content composite;

processing at least one communication received from the first endpoint media device, the second endpoint media device, or a remote system that is remote from the one or more processing devices, the first endpoint media device, and the second endpoint media device, the at least one communication indicative of the at least one operation relating to the adapted first content composite;

adapting a second content composite with a second audio segment, the adapting comprising:
selecting, based at least in part on the at least one communication indicative of the at least one operation relating to the adapted first content composite, the second audio segment; and
configuring the second content composite with the second audio segment so that the adapted second content composite plays the second audio segment for at least part of a second presentation time when the adapted second content composite is presented; and outputting the adapted second content composite for presentation where, consequent to providing the adapted second content composite to the first endpoint media device or the second endpoint media device, the first endpoint media device or the second endpoint media device performs at least one operation relating to the adapted second content composite.

16. The one or more non-transitory, machine-readable media as recited in claim 15, further comprising:
receiving the plurality of audio segments from the content provider system.

17. The one or more non-transitory, machine-readable media as recited in claim 16, where the plurality of audio segments are received with the first content composite.

18. The one or more non-transitory, machine-readable media as recited in claim 17, where the first content composite is adapted with the first audio segment as a function of time.

19. The one or more non-transitory, machine-readable media as recited in claim 18, where the first set of observation data comprises a viewer metric as a function of time, and the first content composite is adapted with the first audio segment as a function of the viewer metric.

20. The one or more non-transitory, machine-readable media as recited in claim 19, where the first set of observation data comprises a current geolocation of the first endpoint media device, and the first content composite is adapted with the first audio segment as a function of the current geolocation.

* * * * *

UNITED STATES PATENT AND TRADEMARK OFFICE
CERTIFICATE OF CORRECTION

PATENT NO. : 11,012,737 B1  
APPLICATION NO. : 16/859736  
DATED : May 18, 2021  
INVENTOR(S) : Kate Megan Carney Landow Page 1 of 1

It is certified that error appears in the above-identified patent and that said Letters Patent is hereby corrected as shown below:

In the Claims

In Column 33, Claim 11, Line 62, please delete "received" and insert -- recited --

In Column 33, Claim 11, Line 63, please delete "wherein" and insert -- where --

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*